C. STILL.
COOLER FOR CONDENSING MIXTURES OF HYDROCARBON AND STEAM.
APPLICATION FILED SEPT. 28, 1911.
1,073,302.
Patented Sept. 16, 1913.
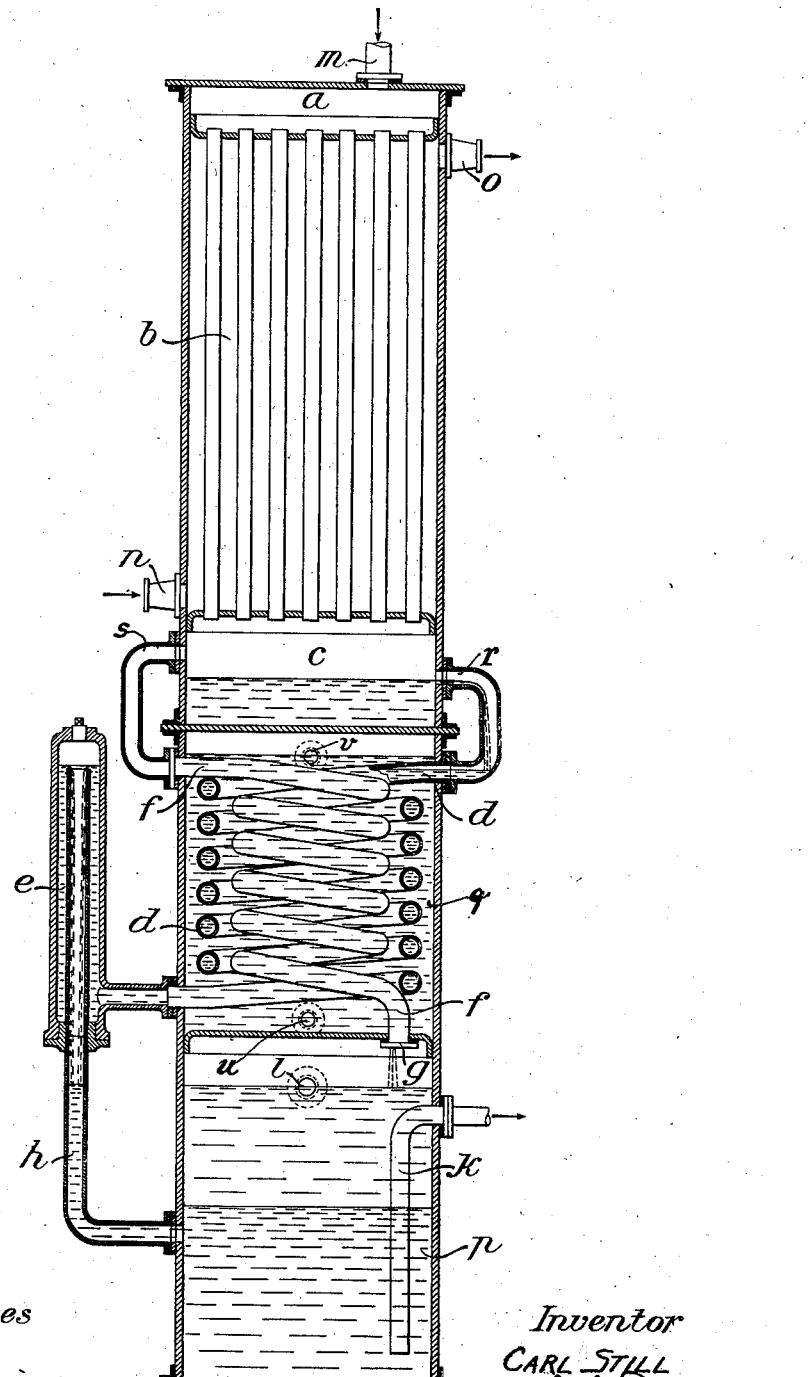
Witnesses
Inventor
CARL STILL
By
ATTORNEY

UNITED STATES PATENT OFFICE.

CARL STILL, OF RECKLINGHAUSEN, GERMANY.

COOLER FOR CONDENSING MIXTURES OF HYDROCARBON AND STEAM.

1,073,302.  Specification of Letters Patent. Patented Sept. 16, 1913.

Application filed September 28, 1911. Serial No. 651,748.

*To all whom it may concern:*

Be it known that I, CARL STILL, a citizen of the German Empire, and residing at Recklinghausen, German Empire, have invented a certain new and useful Cooler for Condensing Mixtures of Hydrocarbon and Steam, of which the following is a description.

In obtaining hydrocarbons direct from distillation gases of pit coal the vapors of benzene eliminated from the wash oil by distillation, which are mixed with steam, are condensed in cooling apparatus into a liquid which is then, in a special receptacle, separated into oils and water, according to the specific gravity. This treatment is, as a rule, carried out consecutively or step-by-step, in several separate pieces of apparatus. The apparatus according to this invention contains a combination of such individual pieces into a complete whole, whereby uniform working is rendered possible and a suitable simplification of the arrangements hitherto in use is obtained.

The accompanying drawing shows in longitudinal section the preferred form of apparatus, which is constructed as an upright cylinder.

The vapor mixture of hydrocarbon and steam to be condensed enters from above at $m$, and passes through the cover into a distributing space $a$, whence it passes through a multitubular cooler $b$ in which the vapor mixture is cooled and largely or wholly condensed by wash oil saturated with hydrocarbons. The wash oil introduced for this purpose at $n$ and carried away from the upper part at $o$ acts as a cooling medium and will also be considerably preheated (for subsequent distillation) by the heat given off by the vapors during condensation. The condensed liquid and the residue of non-condensed vapors pass into the collecting chamber $c$ whence they are both carried away to be separately subjected to a further cooling. The liquid that collects at the bottom of the chamber $c$ runs by a lateral outlet $r$ into an outer worm $d$ arranged in the middle part or zone $q$ of the apparatus which forms a second cooler beneath the above named cooler $b$. The lower discharge end of the worm $d$ is carried upward in the double tube $e$ outside the apparatus for the purpose of keeping the worm $d$ filled with liquid, and of thus utilizing the whole surface of the worm as a direct cooling surface. The residual vapors in the upper part of the chamber $c$ above the liquid pass by a second lateral outlet $s$ arranged at a higher level than the first named outlet $r$ into the second worm $f$ arranged within the worm $d$, where the residue of the vapors is condensed and where, at the same time, this condensed liquid while flowing along the inner surface of the worm $f$ is considerably cooled. The cooled liquid leaves the worm $f$ at its lower end $g$, trickling down in a thin jet. Both worms $d$ and $f$ within the chamber $q$ are surrounded by the same cooling medium, namely, water which enters at the lower part of the cooling chamber at $u$ and is discharged at the upper part thereof at $v$. The lowermost chamber $p$ is the collecting chamber into which the liquid from the inner worm $f$ enters at its discharging end $g$, while the quantity of liquid carried through the outer worm $d$ enters said chamber $p$ through the tube $h$, said chamber enabling the two liquids in the mixture to be separated according to their specific gravity. The heavier liquid, water, is then drawn from the lowest point of the chamber $p$ by the tube $k$, while the lighter oil is drawn off at a point higher up, at $l$, for further treatment. Thus the arrangement of the apparatus, being of simple construction, enables the whole of the individual treatments necessary, from the beginning to the end of the process, to be carried out in their natural succession.

I claim as my invention:—

1. In coolers for condensing mixtures of hydrocarbon and steam, the combination of a vertical cylinder having transverse partitions thereof forming a lower chamber, a worm chamber, an upper chamber, a tube chamber and a distributing space; tubes in the tube chamber and connecting the distributing space with the upper chamber; a pair of worms in the worm chamber and connecting the upper and lower parts respectively of the upper chamber with the corresponding parts of the lower chamber; means for conducting cooling fluid to the tube chamber; means for conducting cooling fluid to the worm chamber; and discharge means for the upper and lower parts respectively of the lower chamber.

2. In coolers for condensing mixtures of hydrocarbon and steam, the combination of a vertical cylinder having transverse partitions thereof forming a lower chamber, a worm chamber, an upper chamber, a tube chamber and a distributing space, tubes in the tube chamber and connecting the distributing space with the upper chamber; a pair of worms in the worm chamber and connecting the upper and lower parts respectively of the upper chamber with the corresponding parts of the lower chamber; means for conducting cooling fluid to the tube chamber; means for conducting cooling fluid to the worm chamber; and discharge means for the upper and lower parts respectively of the lower chamber, said worm connecting the lower part of the chambers extending outside of said cylinder and forming a passage extending from the lower part of the worm chamber on the outside of the cylinder to a point near the upper part thereof.

3. In a cooler for condensing mixtures of hydrocarbon and steam, the combination of a vertical cylinder; a series of vertical vapor condensing tubes therein; means for feeding the vapors into the said tubes; means for passing a cooling oil around said tubes; a chamber beneath said tubes for receiving the vapors and liquid therefrom; a worm communicating with the upper part of the chamber for the vapors and another worm communicating with the lower part of the chamber for the liquid emerging therefrom, both worms extending lower than said chamber; means for cooling the two worms, and another chamber receiving the vapor worm at its upper part and the liquid worm at its lower part for finally separating the lighter and heavier liquids and means for discharging the liquids from the last named chamber.

4. In a cooler for condensing mixtures of hydrocarbon and steam, the combination of a vertical cylinder; a series of vertical vapor condensing tubes therein, means for feeding the vapors into the said tubes, means for passing a cooling oil around the tubes; a chamber adapted to receive the vapors and liquid from the tubes; a worm for the vapors and another worm for the liquid emerging from the said chamber and communicating with the upper and lower parts of the chamber respectively and extending beneath the chamber; another means for passing a cooling fluid around the active part of the worms for cooling the worms; another chamber for finally separating the lighter and heavier liquids and having its upper and lower parts communicating with the worm for the vapors and the worm for the liquid respectively; said worm for the liquids being formed on the outside of the apparatus so as to extend from below its active part to a point above its active part; and means for discharging the liquids into last named chamber.

In testimony whereof I affix my signature in the presence of two witnesses.

CARL STILL.

Witnesses:
 ERNST KRAMER,
 ANIS VANDORF.